US009144231B1

(12) United States Patent
Davis

(10) Patent No.: US 9,144,231 B1
(45) Date of Patent: Sep. 29, 2015

(54) DISPENSER SYSTEM FOR PEST/RODENTS AND ASSOCIATED METHOD

(76) Inventor: Dorothy Davis, Nederland, TX (US)

( * ) Notice: Subject to any disclaimer, the term of this patent is extended or adjusted under 35 U.S.C. 154(b) by 947 days.

(21) Appl. No.: 13/298,153

(22) Filed: Nov. 16, 2011

Related U.S. Application Data

(60) Provisional application No. 61/414,135, filed on Nov. 16, 2010.

(51) Int. Cl.
*A01M 7/00* (2006.01)
*A01M 13/00* (2006.01)

(52) U.S. Cl.
CPC . *A01M 13/00* (2013.01); *A01M 7/00* (2013.01)

(58) Field of Classification Search
CPC ..... A01M 1/20; A01M 13/00; A01M 13/006; A01M 7/00
USPC ......................... 43/124, 125, 129, 131, 132.1
See application file for complete search history.

(56) References Cited

U.S. PATENT DOCUMENTS 1,642,920 A * 9/1927 Cooper ........................... 222/49
1,783,882 A * 12/1930 Kohn ........................... 222/385
2,462,701 A * 2/1949 Wirth ........................... 30/123.3
2,600,602 A * 6/1952 Abildgaard ................... 119/669
4,349,981 A 9/1982 Sherman
4,386,637 A * 6/1983 Buchanan et al. .............. 141/65
4,581,378 A 4/1986 Lazar et al.
4,702,416 A * 10/1987 Pagliai et al. .................. 239/11
4,753,032 A 6/1988 Sherman
4,906,472 A 3/1990 Gasseling et al.
5,027,548 A 7/1991 Anderson
5,180,085 A * 1/1993 Schmid ......................... 222/211
5,797,517 A * 8/1998 Weinstein ....................... 222/95
6,171,098 B1 * 1/2001 Meyer et al. .................... 431/72
6,264,120 B1 * 7/2001 Wintering et al. ............ 239/333
6,405,907 B1 * 6/2002 Roberts ......................... 222/385
6,860,788 B2 * 3/2005 Small et al. ................... 446/475
7,137,269 B1 * 11/2006 Maranville ....................... 62/306
9,027,855 B2 * 5/2015 Nishimura .................... 239/525
2014/0263729 A1 * 9/2014 Stewart ......................... 239/154

* cited by examiner

*Primary Examiner* — Christopher P Ellis
*Assistant Examiner* — Michael Wang

(57) ABSTRACT

A pest control dispersal spray system for a building preferably includes a reservoir having a cavity housing a pest control agent. The reservoir has a discharge mechanism selectively expelling the existing pest control agent outwardly and away from the reservoir while the reservoir remains at a stationary position. A discharge nozzle may be attached to the reservoir and may be in fluid communication with the cavity. A plurality of interconnected tubes may be located exterior of the reservoir and may be in fluid communication with the discharge nozzle. In this manner, activation of the discharge mechanism causes the existing pest control agent to flow through the cavity, egress the reservoir via the discharge nozzle, and thereafter travel along the interconnected tubes such that the existing pest control agent is dispersed outwardly from the interconnected tubes while the reservoir remains stationary.

13 Claims, 3 Drawing Sheets

DISPENSER SYSTEM FOR PEST/RODENTS AND ASSOCIATED METHOD

CROSS REFERENCE TO RELATED APPLICATIONS

This application claims the benefit of U.S. Provisional Application No. 61/414,135, filed Nov. 16, 2010, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to pest control systems and, more particularly, to a pest dispersal spray system for providing users with a means to kill, prevent or ward off unwanted pests from underneath and around trailers, mobile homes and crawl spaces of homes.

2. Prior Art

Rodents are both a nuisance and a health hazard to humans. According to the Center for Disease Control & Prevention (CDC), rodents such as rats can spread diseases such as typhus, meningitis, and fever. Rodents are widely credited as a primary carrier of the bubonic plague through Europe in the $14^{th}$ century. While modern medicine has advanced in recent years, the culling and control of the rodent population has been pivotal in preventing widespread disease. This control is achieved in large part through the use of pest control products.

Mechanical sprayers are a common form of pest control solutions. Hydraulic sprayers usually consist of a tank, a pump, a lance (for single nozzles) or boom, and a nozzle (or multiple nozzles). Sprayers convert a pesticide formulation, often containing a mixture of water (or another liquid chemical carrier) and chemical, into droplets, which can be large rain-type drops or tiny almost-invisible particles. This conversion is accomplished by forcing the spray mixture through a spray nozzle under pressure. Current pest control solutions of this nature require a user to actively direct the spray nozzles onto the pests. In situations where pests need to be exterminated or ran off immediately, a user must confront and direct the spray manually at the rodent. This is both inconvenient and cumbersome to the user as the pest may be in an unreachable place such as underneath trailers, mobile homes and crawl spaces of homes.

Accordingly, a need remains for a system in order to overcome the above-noted shortcomings. The present invention satisfies such a need by providing a pest dispersal spray system that is convenient and easy to use, lightweight yet durable in design, versatile in its applications, and designed for providing a user with a means to kill, prevent or ward off unwanted pests from underneath and around trailers, mobile homes and crawl spaces of homes.

BRIEF SUMMARY OF THE INVENTION

In view of the foregoing background, it is therefore an object of the non-limiting exemplary embodiments to provide a pest control dispersal spray system for a building. These and other objects, features, and advantages of the invention are provided by a pest control dispersal spray system preferably including a reservoir having a cavity formed therein. Such a cavity is adapted to house a predetermined quantity of an existing pest control agent. The reservoir further has a discharge mechanism capable of selectively expelling the existing pest control agent outwardly and away from the reservoir while the reservoir remains at a stationary position.

A discharge nozzle may be attached to the reservoir and may be in fluid communication with the cavity. A plurality of interconnected tubes may be located exterior of the reservoir and may be in fluid communication with the discharge nozzle. In this manner, activation of the discharge mechanism causes the existing pest control agent to flow through the cavity, egress the reservoir via the discharge nozzle, and thereafter travel along the interconnected tubes such that the existing pest control agent is dispersed outwardly from the interconnected tubes while the reservoir remains stationary.

In a non-limiting exemplary embodiment, the discharge mechanism preferably includes a foot pedal situated exterior of the reservoir and adapted to be engaged by a user, a first cam arm statically mated to the foot pedal and pivotally mated to the reservoir, and a second cam arm pivotally mated to the first cam arm. In this manner, downward movement of the foot pedal causes articulation of the first cam arm about a fulcrum axis as well as upward movement of the second cam arm within the reservoir.

In a non-limiting exemplary embodiment, the discharge mechanism may further include a bracket pivotally mated to the second cam arm, an actuation plate statically mated to the bracket and seated thereabove, a rod statically mated to the actuation plate and extending upwardly therefrom, a stop member statically affixed to the rod, and a spring member statically mated to the stop member and an inner wall of the reservoir. Advantageously, activation of the discharge mechanism causes upward movement of the actuation plate and compression of the spring member to a tensed state. In this manner, deactivation of the discharge mechanism causes downward movement of the actuation plate and expansion of the spring member to an equilibrium state.

In a non-limiting exemplary embodiment, the second cam arm may be completely located within the reservoir and spaced exterior of the cavity such that the first cam arm remains isolated from the existing pest control agent.

In a non-limiting exemplary embodiment, a major portion of the first cam arm may be completely located within the reservoir and spaced exterior of the cavity such that the second cam arm remains isolated from the existing pest control agent.

In a non-limiting exemplary embodiment, the discharge nozzle may include a diaphragm resiliently expanded and released between open and closed positions when the discharge mechanism is activated and deactivated respectively.

In a non-limiting exemplary embodiment, the actuation plate may be reciprocated along a linear travel path within the reservoir when the discharge mechanism is activated and deactivated respectively.

In a non-limiting exemplary embodiment, the reservoir may further include an end cap mated to an outer surface thereof. The aforementioned rod may be rectilinear and may have a proximal end affixed to a top surface of the actuation plate. Such a rod may further have a distal end penetrating through the inner wall of the reservoir, when the actuation plate is moved upward, such that the distal end directly engages the end cap.

In a non-limiting exemplary embodiment, the present disclosure may further include a method of utilizing a pest control dispersal spray system for a building. Such a method preferably comprises the initial step of: providing a reservoir having a cavity formed therein wherein the cavity is adapted to house a predetermined quantity of an existing pest control agent. Such a reservoir may have a discharge mechanism capable of selectively expelling the existing pest control agent outwardly and away from the reservoir while the reservoir remains at a stationary position. The method may further include the chronological steps of: providing and attaching a discharge nozzle to the reservoir such that the discharge nozzle is in fluid communication with the cavity; providing and locating a plurality of interconnected tubes exterior of the reservoir such that the interconnected tubes are in fluid communication with the discharge nozzle; and activating the discharge mechanism thereby causing the existing pest control agent to flow through the cavity, egress the reservoir via the discharge nozzle, and thereafter travel along the interconnected tubes such that the existing pest control agent is dispersed outwardly from the interconnected tubes while the reservoir remains stationary.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
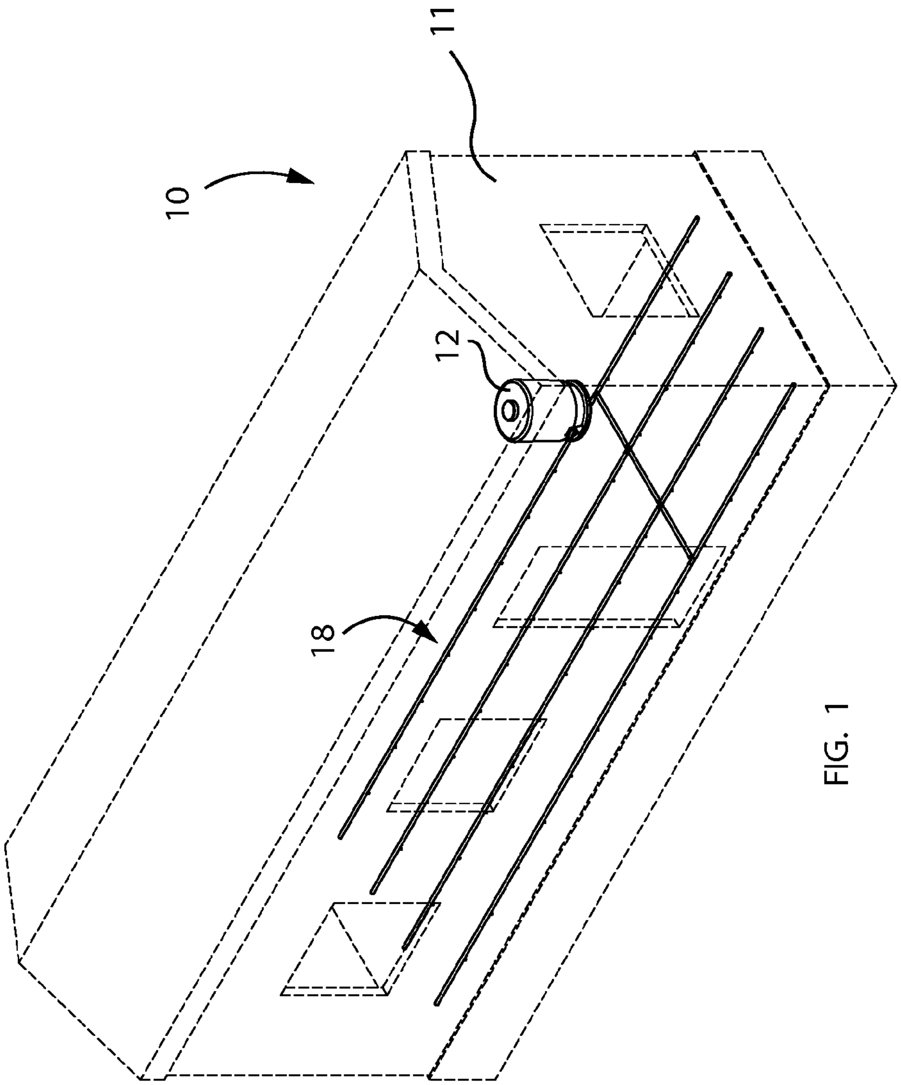
FIG. 1 is a perspective view showing a pest control agent dispersing system located in a preferred environment, in accordance with a non-limiting exemplary embodiment of the present discourse.

Those skilled in the art will appreciate that the figures are not intended to be drawn to any particular scale; nor are the figures intended to illustrate every embodiment of the invention. The invention is not limited to the exemplary embodiments depicted in the figures.

DETAILED DESCRIPTION OF THE INVENTION

The non-limiting exemplary embodiments will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "non-limiting exemplary embodiments" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the non-limiting exemplary embodiments. Thus, to the maximum extent allowed by law, the scope of the non-limiting exemplary embodiments is to be determined by the broadest permissible interpretation of the following claims and their equivalents, and shall not be restricted or limited by the foregoing detailed description.

References in the specification to “one embodiment”, “an embodiment”, “a preferred embodiment”, “an alternative embodiment” and similar phrases mean that a particular feature, structure, or characteristic described in connection with the embodiment is included in at least an embodiment of the invention. The appearances of the phrase “a non-limiting exemplary embodiment” in various places in the specification are not necessarily all meant to refer to the same embodiment.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments.

Figure 3:
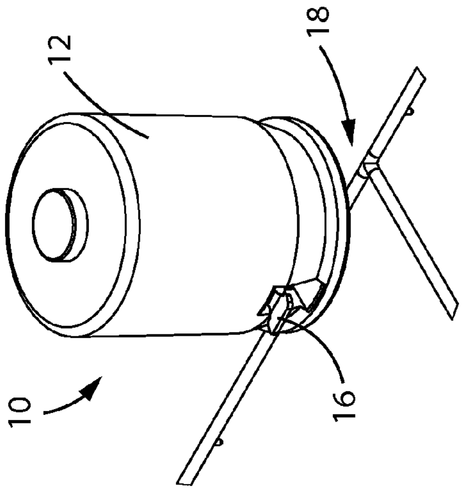
FIG. 3 is an enlarged perspective view of the pest control agent dispersing system taken from section 3 in FIG. 2.
Figure 4:
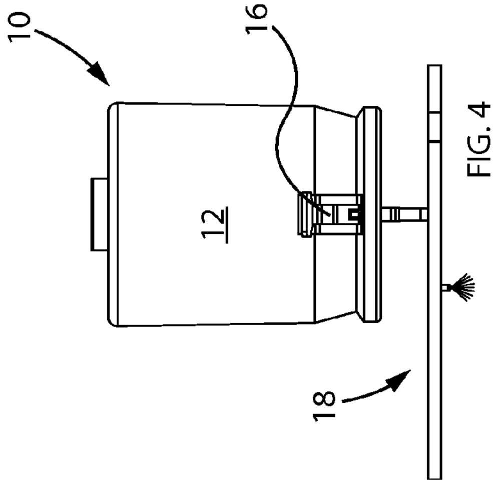
FIG. 4 is a side elevational view of the pest control agent dispersing system shown in FIG. 3.
Figure 2:
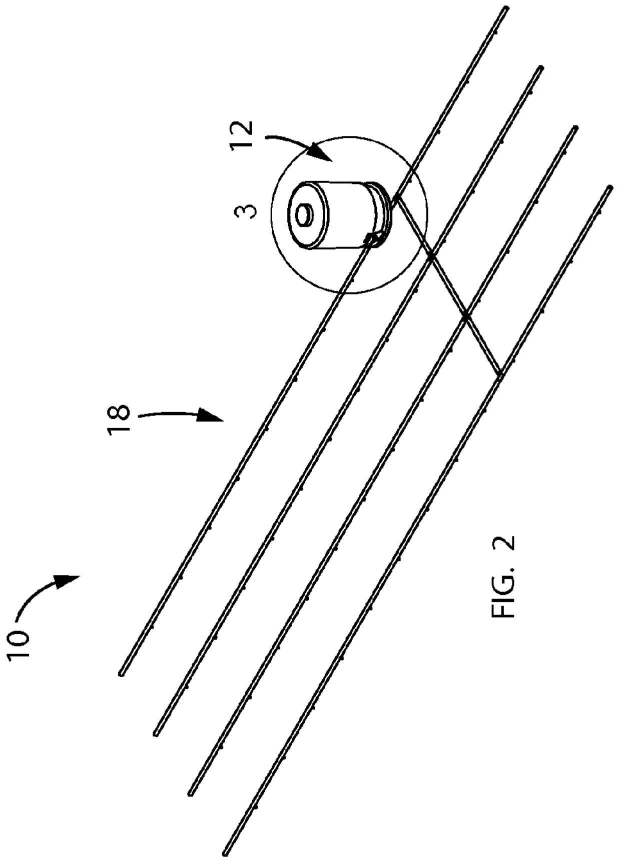
FIG. 2 is a perspective view of the pest control agent dispersing system without reference to the preferred environment.
Figure 6:
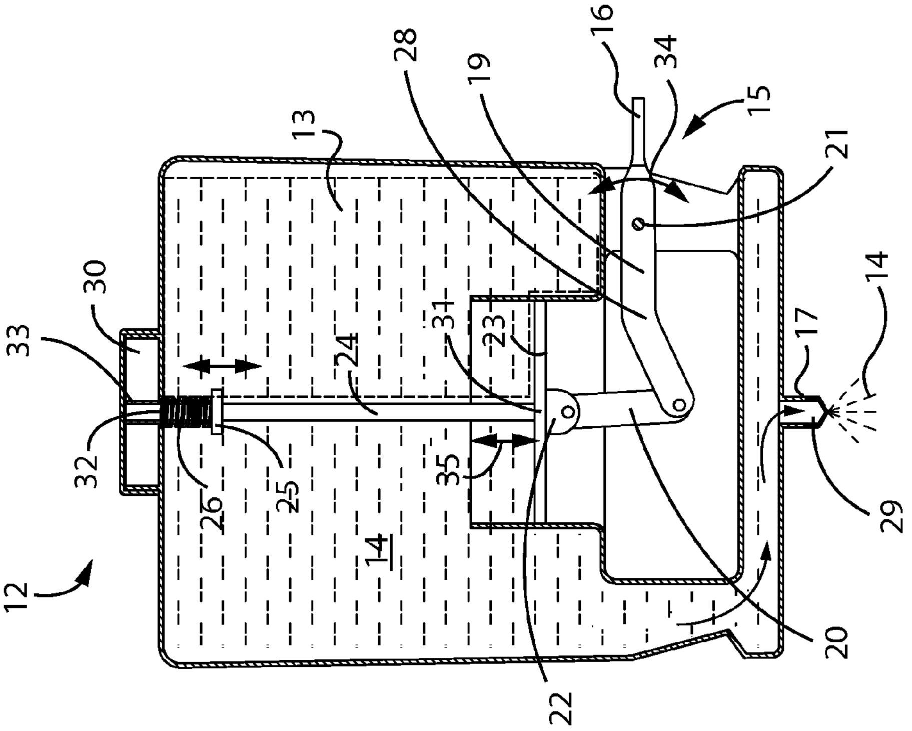
FIG. 6 is an exposed view showing the interconnection between the major mechanical components of the discharge mechanism disposed at an activated state.
Figure 5:
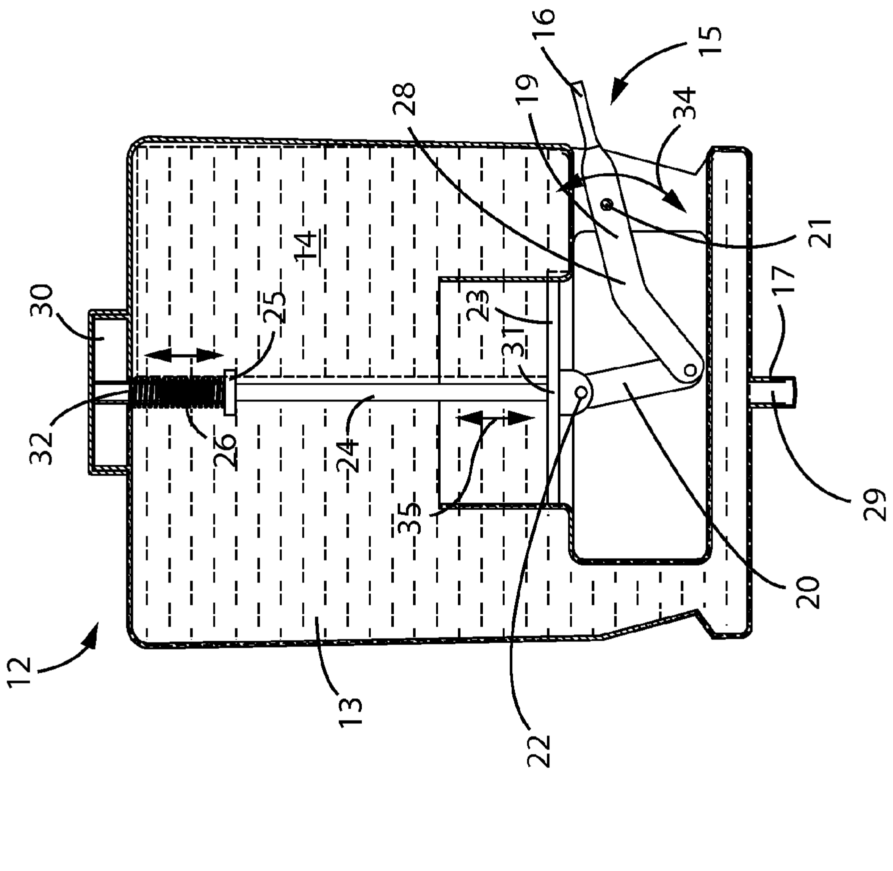
FIG. 5 is an exposed view showing the interconnection between the major mechanical components of the discharge mechanism disposed at a deactivated state.

Non-limiting exemplary embodiment(s) of the present disclosure is referred to generally in FIGS. 1-6 and is intended to provide a pest control dispersal spray system 10 for a building 11 or like structure. It should be understood that the present invention 10 may be used to kill, prevent or ward off unwanted pests from underneath and around trailers, mobile homes and crawl spaces of homes and the like, and should not be limited to the uses described herein.

Referring to FIGS. 1-6, the pest control dispersal spray system 10 preferably includes a reservoir 12 having a cavity 13 formed therein. Such a cavity 13 is adapted to house a predetermined quantity of an existing pest control agent 14. The reservoir 12 further has a discharge mechanism 15 capable of selectively expelling the existing pest control agent 14 outwardly and away from the reservoir 12 while the reservoir 12 remains at a stationary position such as in a basement or easily accessible location, for example. Of course, it will be appreciated by those skilled in the art that the reservoir 12 and discharge mechanism 15 may be suitable calibrated to effectuate an appropriate amount of pest control agent 14 for various sized/shaped buildings 12.

A discharge nozzle 17 may be attached to the reservoir 12 and may be in fluid communication with the cavity 13. A plurality of interconnected tubes 18 may be located exterior of the reservoir 12 and may be in fluid communication with the discharge nozzle 17. In this manner, activation of the discharge mechanism 15 causes the existing pest control agent 14 to flow through the cavity 13, egress the reservoir 12 via the discharge nozzle 17, and thereafter travel along the interconnected tubes such that the existing pest control agent 14 is dispersed outwardly from the interconnected tubes 18 while the reservoir 12 remains stationary. Advantageously, the sprayed pest control agent 14 may emanate from the interconnected tubes 18 underneath and around a building 11, for example. Such a structural configuration provides the unexpected and unpredictable advantage of permitting a user to quickly and effectively disperse the pest control agent 14 throughout various areas of a building 11 without having to physically and independently access such various areas of the building 11. In addition, the reservoir 12 remains stationary and reduces the likelihood of undesirable user exposure to contamination.

In a non-limiting exemplary embodiment, the discharge mechanism 15 preferably includes a foot pedal 16 situated exterior of the reservoir 12 that is adapted to be engaged by a user, a first cam arm 19 statically may be mated to the foot pedal 16 and pivotally mated to the reservoir 12, and a second cam arm 20 may be pivotally mated to the first cam arm 19. In this manner, downward movement of the foot pedal 16 causes articulation 34 of the first cam arm 19 about a fulcrum axis 21 as well as upward movement of the second cam arm 20 within the reservoir 12. Such a structural configuration provides the unexpected and unpredictable advantage of controlling the dispersal of the pest control agent 14 from a single location while maintaining a user’s hand and facial areas safely spaced away from the discharge mechanism 15.

In a non-limiting exemplary embodiment, the discharge mechanism 15 may further include a bracket 22 pivotally mated to the second cam arm 20, an actuation plate 23 may be statically mated to the bracket 22 and seated thereabove, a rod 24 may be statically mated to the actuation plate 23 and extends upwardly therefrom, a stop member 25 may be statically affixed to the rod 24, and a spring member 26 may be statically mated to the stop member 25 and an inner wall 32 of the reservoir 12. Advantageously, activation of the discharge mechanism 15 causes upward movement of the actuation plate 23 and compression of the spring member 26 to a tensed state. In this manner, deactivation of the discharge mechanism 15 (release of foot pedal 16) causes downward movement of the actuation plate 23 and expansion of the spring member 26 to an equilibrium state. Such a structural configuration provides the unexpected and unpredictable advantage of uniform and controlled activation/deactivation of the discharge mechanism 15 which thereby reduces the likelihood of equipment failure.

In a non-limiting exemplary embodiment, the second cam arm 20 may be completely located within the reservoir 12 and spaced exterior of the cavity 13 such that the first cam arm 19 remains isolated from the existing pest control agent 14. Such a structural configuration provides the unexpected and unpredictable advantage of preventing undesirable contamination to moving components exposed to ambient atmosphere surrounding the reservoir 12.

In a non-limiting exemplary embodiment, a major portion 28 of the first cam arm 19 may be completely located within the reservoir 12 and spaced exterior of the cavity 13 such that the second cam arm 20 remains isolated from the existing pest control agent 14. Such a structural configuration provides the unexpected and unpredictable advantage of preventing undesirable contamination to moving components exposed to ambient atmosphere surrounding the reservoir 12.

In a non-limiting exemplary embodiment, the discharge nozzle 17 may include a diaphragm 29 resiliently expanded and released between open and closed positions when the discharge mechanism 15 is activated and deactivated, respectively. In this manner, pressure fluctuations caused by reciprocal movement 35 of rod 24 expand/release diaphragm 29. Such a structural configuration provides the unexpected and unpredictable advantage of preventing undesirable and premature egress/ingress of the pest control agent 14 during none activated conditions.

In a non-limiting exemplary embodiment, the actuation plate 23 may be reciprocated along a linear travel path 35 within the reservoir 12 when the discharge mechanism 15 is activated and deactivated, respectively. Such a structural configuration provides the unexpected and unpredictable advantage of ensuring uniform dispersion of the pest control agent 14 from the cavity 13 to the discharge nozzle 17 without causing undesirable back flow of the pest control agent 14 due to non-uniform displacement of pressure within cavity 13.

In a non-limiting exemplary embodiment, the reservoir 12 may further include an end cap 30 mated to an outer surface thereof. The aforementioned rod 24 may be rectilinear and may have a proximal end 31 affixed to a top surface of the actuation plate 23. Such a rod 24 may further have a distal end 33 selectively penetrating through an inner wall 32 of the reservoir 12, when the discharge mechanism 15 is activated, such that distal end 33 directly engages end cap 30 and prevents further upward movement of actuation plate 23. In this manner rod 24 penetrates through an opening in inner wall 32 of reservoir 12 prior to reaching end cap 30. Of course, while end cap 30 is engaged with the reservoir 12, pressure is sealed within cavity 13 for permitting discharge of pest control agent 14. Such a structural configuration provides the unexpected and unpredictable advantage of permitting manual access to the rod 24 by removing the end cap 30 from the reservoir 12, when the discharge mechanism 15 becomes inoperable during periodic use.

In a non-limiting exemplary embodiment, the present disclosure may further include a method of utilizing a pest control dispersal spray system 10 for a building 11. Such a method preferably comprises the initial step of: providing a reservoir 12 having a cavity 13 formed therein wherein the cavity 13 is adapted to house a predetermined quantity of an existing pest control agent 14. Such a reservoir 12 may have a discharge mechanism 15 capable of selectively expelling the existing pest control agent 14 outwardly and away from the reservoir 12 while the reservoir 12 remains at a stationary position. The method may further include the chronological steps of: providing and attaching a discharge nozzle 17 to the reservoir 12 such that the discharge nozzle 17 is in fluid communication with the cavity 13; providing and locating a plurality of interconnected tubes 18 exterior of the reservoir 12 such that the interconnected tubes 18 are in fluid communication with the discharge nozzle 17; and activating the discharge mechanism 15 thereby causing the existing pest control agent 14 to flow through the cavity 13, egress the reservoir 12 via the discharge nozzle 17, and thereafter travel along the interconnected tubes 18 such that the existing pest control agent 14 is dispersed outwardly from the interconnected tubes 18 while the reservoir 12 remains stationary. Such a structural configuration provides the unexpected and unpredictable advantage of permitting a user to quickly and effectively disperse the pest control agent 14 throughout various areas of the building 11 without having to physically access such various areas of the building 11. In addition, the reservoir 12 remains stationary and reduces the likelihood of undesirable contamination with a user or surrounding areas.

In a non-limiting exemplary embodiment, the reservoir 12 may be filled with a chemical formulation such as an anti-vegetation chemical for controlling unwanted vegetation under or around a building 11.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the non-limiting exemplary embodiments may include variations in size, materials, shape, form, function and manner of operation.

What is claimed as new and what is desired to secure by Letters Patent of the United States is:

1. A pest control dispersal spray system for a building, said pest control dispersal spray system comprising:

a reservoir having a cavity formed therein, said cavity being adapted to house a predetermined quantity of an existing pest control agent, said reservoir having a discharge mechanism capable of selectively expelling the existing pest control agent outwardly and away from said reservoir;

a discharge nozzle attached to said reservoir and being in fluid communication with said cavity; and a plurality of interconnected tubes located exterior of said reservoir and being in fluid communication with said discharge nozzle;

wherein activation of said discharge mechanism causes the existing pest control agent to egress said reservoir via said discharge nozzle and thereafter travel along said interconnected tubes such that the existing pest control agent is dispersed outwardly from said interconnected tubes;

wherein said discharge mechanism comprises a foot pedal situated exterior of said reservoir and adapted to be engaged by a user, a first cam arm statically mated to said foot pedal and pivotally mated to said reservoir, and a second cam arm pivotally mated to said first cam arm, wherein downward movement of said foot pedal causes articulation of said first cam arm about a fulcrum axis and upward movement of said second cam arm within said reservoir, a bracket pivotally mated to said second cam arm, an actuation plate statically mated to said bracket and seated thereabove, a rod statically mated to said actuation plate and extending upwardly therefrom, a stop member statically affixed to said rod, and a spring member statically mated to said stop member and an inner wall of said reservoir, wherein activation of said discharge mechanism causes upward movement of said actuation plate and compression of said spring member to a tensed state, and wherein deactivation of said discharge mechanism causes downward movement of said actuation plate and expansion of said spring member to an equilibrium state.

2. The pest control dispersal spray system of claim 1, wherein said second cam arm is completely located within said reservoir and spaced exterior of said cavity such that said first cam arm remains isolated from the existing pest control agent.

3. The pest control dispersal spray system of claim 1, wherein a major portion of said first cam arm is completely located within said reservoir and spaced exterior of said cavity such that said second cam arm remains isolated from the existing pest control agent.

4. The pest control dispersal spray system of claim 1, wherein said discharge nozzle comprises: a diaphragm resiliently expanded and released between open and closed positions when said discharge mechanism is activated and deactivated respectively.

5. The pest control dispersal spray system of claim 1, wherein said actuation plate is reciprocated along a linear travel path within said reservoir when said discharge mechanism is activated and deactivated respectively.

6. The pest control dispersal spray system of claim 1, wherein said reservoir comprises an end cap mated to a outer surface thereof, said rod is rectilinear and has a proximal end affixed to a top surface of said actuation plate and further has a distal end penetrating through said inner wall of said reservoir, when said actuation plate is moved upward, such that said distal end engages said end cap.

7. A pest control dispersal spray system for a building, said pest control dispersal spray system comprising:

a reservoir having a cavity formed therein, said cavity being adapted to house a predetermined quantity of an existing pest control agent, said reservoir having a discharge mechanism capable of selectively expelling the existing pest control agent outwardly and away from said reservoir while said reservoir remains at a stationary position;

a discharge nozzle attached to said reservoir and being in fluid communication with said cavity; and a plurality of interconnected tubes located exterior of said reservoir and being in fluid communication with said discharge nozzle;

wherein activation of said discharge mechanism causes the existing pest control agent to flow through said cavity, egress said reservoir via said discharge nozzle, and thereafter travel along said interconnected tubes such that the existing pest control agent is dispersed outwardly from said interconnected tubes while said reservoir remains stationary;

wherein said discharge mechanism comprises a foot pedal situated exterior of said reservoir and adapted to be engaged by a user, a first cam arm statically mated to said foot pedal and pivotally mated to said reservoir, and a second cam arm pivotally mated to said first cam arm, wherein downward movement of said foot pedal causes articulation of said first cam arm about a fulcrum axis and upward movement of said second cam arm within said reservoir, a bracket pivotally mated to said second cam arm, an actuation plate statically mated to said bracket and seated thereabove, a rod statically mated to said actuation plate and extending upwardly therefrom, a stop member statically affixed to said rod, and a spring member statically mated to said stop member and an inner wall of said reservoir, wherein activation of said discharge mechanism causes upward movement of said actuation plate and compression of said spring member to a tensed state, and wherein deactivation of said discharge mechanism causes downward movement of said actuation plate and expansion of said spring member to an equilibrium state.

8. The pest control dispersal spray system of claim 7, wherein said second cam arm is completely located within said reservoir and spaced exterior of said cavity such that said first cam arm remains isolated from the existing pest control agent.

9. The pest control dispersal spray system of claim 7, wherein a major portion of said first cam arm is completely located within said reservoir and spaced exterior of said cavity such that said second cam arm remains isolated from the existing pest control agent.

10. The pest control dispersal spray system of claim 7, wherein said discharge nozzle comprises: a diaphragm resiliently expanded and released between open and closed positions when said discharge mechanism is activated and deactivated respectively.

11. The pest control dispersal spray system of claim 7, wherein said actuation plate is reciprocated along a linear travel path within said reservoir when said discharge mechanism is activated and deactivated respectively.

12. The pest control dispersal spray system of claim 7, wherein said reservoir comprises an end cap mated to a outer surface thereof, said rod is rectilinear and has a proximal end affixed to a top surface of said actuation plate and further has a distal end penetrating through said inner wall of said reservoir, when said actuation plate is moved upward, such that said distal end engages said end cap.

13. A method of utilizing a pest control dispersal spray system for a building, said method comprising the chronological steps of:

providing a reservoir having a cavity formed therein, said cavity being adapted to house a predetermined quantity of an existing pest control agent, said reservoir having a discharge mechanism capable of selectively expelling the existing pest control agent outwardly and away from said reservoir while said reservoir remains at a stationary position;

providing and attaching a discharge nozzle to said reservoir such that said discharge nozzle is in fluid communication with said cavity;

providing and locating a plurality of interconnected tubes exterior of said reservoir such that said interconnected tubes are in fluid communication with said discharge nozzle; and activating said discharge mechanism thereby causing the existing pest control agent to flow through said cavity, egress said reservoir via said discharge nozzle, and thereafter travel along said interconnected tubes such that the existing pest control agent is dispersed outwardly from said interconnected tubes while said reservoir providing said discharge mechanism with a foot pedal situated exterior of said reservoir and adapted to be engaged by a user, a first cam arm statically mated to said foot pedal and pivotally mated to said reservoir, and a second cam arm pivotally mated to said first cam arm, wherein downward movement of said foot pedal causes articulation of said first cam arm about a fulcrum axis and upward movement of said second cam arm within said reservoir, a bracket pivotally mated to said second cam arm, an actuation plate statically mated to said bracket and seated thereabove, a rod statically mated to said actuation plate and extending upwardly therefrom, a stop member statically affixed to said rod, and a spring member statically mated to said stop member and an inner wall of said reservoir, wherein activation of said discharge mechanism causes upward movement of said actuation plate and compression of said spring member to a tensed state, and wherein deactivation of said discharge mechanism causes downward movement of said actuation plate and expansion of said spring member to an equilibrium state.

* * * * *